United States Patent [19]
Ryan

[11] Patent Number: 5,237,604
[45] Date of Patent: Aug. 17, 1993

[54] ARRANGEMENT FOR SERVING A TELEPHONE OFFICE CODE FROM TWO SWITCHING SYSTEMS

[75] Inventor: Deirdre T. H. Ryan, Westfield, N.J.

[73] Assignee: AT&T Bell Laboratories, Murray Hill, N.J.

[21] Appl. No.: 723,139

[22] Filed: Jun. 28, 1991

[51] Int. Cl.[5] .................. H04M 7/00; H04M 3/42
[52] U.S. Cl. ............................ 379/220; 379/201; 379/207; 379/210; 379/211; 379/219; 379/230
[58] Field of Search ............ 379/201, 207, 219, 220, 379/221, 230, 210, 211, 212

[56] References Cited

U.S. PATENT DOCUMENTS

| | | | |
|---|---|---|---|
| 4,191,860 | 3/1980 | Weber | 179/18 B |
| 4,310,727 | 1/1982 | Lawser | 379/207 |
| 4,313,035 | 1/1982 | Jordan et al. | 379/230 X |
| 4,348,554 | 9/1982 | Asmuth | 379/221 X |
| 4,611,096 | 9/1986 | Asmuth et al. | 379/230 X |
| 4,737,983 | 4/1988 | Frauenthal et al. | 379/265 X |

OTHER PUBLICATIONS

L. J. Gawron et al., "No. 1/1A ESS-SPC Network Capabilities and SignalingArchitecture" *The Bell System Technical Journal*, vol. 61, No. 7 Sep. 1982, pp. 1611-1636.

Technical Reference TR-TSY-000402, Bellcore, Issue 2, Jul. 1989, Revision 1, May 1991.

Primary Examiner—James L. Dwyer
Assistant Examiner—Harry S. Hong
Attorney, Agent, or Firm—Werner Ulrich

[57] ABSTRACT

This invention relates to a method and apparatus for establishing connections over a public switched telephone network to a customer whose telephone number is in a block associated, for routing purposes, with a first telephone switching system, but who is actually served by a second telephone switching system. The facility for carrying out this method is desirable in order to serve customers who need the advanced functions of a digital switching system, who are currently served by an analog switching system, and do not wish to have their telephone number changed when they switch to being served by the digital switching system. In accordance with the invention, a centralized database is queried to find the identity of the switch serving the called customer. The database returns a routing index for routing the call to that switch.

10 Claims, 4 Drawing Sheets

DATABASE PROCESSING

END SWITCH PROCESSING

ARRANGEMENT FOR SERVING A TELEPHONE OFFICE CODE FROM TWO SWITCHING SYSTEMS

CROSS-REFERENCE TO RELATED APPLICATION

This application relates to an application by William J. Bushnell entitled "Method of Rerouting Telecommunications Traffic" filed Apr. 24, 1991, Ser. No. 691,578, and assigned to the same assignee as this application.

TECHNICAL FIELD

This invention relates to telecommunications networks and, more specifically, to routing calls in such networks.

PROBLEM

During the last decade, a large number of digital switching systems (switches) have been introduced into the local and toll telephone switching plant in the United States. At the same time, a large number of customers continued to be served by the older analog switches, such as the 1A ESS TM switches manufactured by AT&T Network Systems. In the past when customers have wanted to have features offered only by digital switches, such as the 5ESS® switch manufactured by AT&T Network Systems, they have been transferred to such switches. At present, such a transfer is inevitably accompanied by a change of the customer's telephone number, a public routing number for routing calls to the customer's telephone(s), since each switch serves one or more blocks of such numbers and when a customer with a particular number is transferred out of one switch to be served by a second switch, his number is not in one of the blocks of numbers of that second switch. It would be possible to route all traffic to that customer through the first switch, but such an arrangement would be very expensive, since it would continue indefinitely to require a double switching operation in order to be connected to that customer and would require the use of additional plant facilities interconnecting the two switches. On the other hand, many customers are very unhappy about having their telephone number changed because their number is widely known, is on their stationery, and all of their customers and other contacts must be notified of the change. Furthermore, a number change is expensive for a telephone operating company, since calls to the old number must be intercepted and the callers be provided with the new telephone number.

A number of solutions have been used in the past for avoiding a number change while serving the customer from a different switch. One such solution is to route the call to the original switch and pass the call forward to the new switch via a set of foreign exchange lines. This solution is very expensive because of the large number of foreign exchange lines that are required and the high cost for each. A second solution is to use permanent call forwarding from the original switch to the new switch. The calls are routed to the original switch which has a call forwarding indication to a pseudo number in the new switch and forwards the call to that pseudo number. The callers are not aware of this pseudo number. Again, this solution is expensive because the call must be processed in the orignal switch as well as the new switch and because extensive interoffice facilities between the two switches must be provided. Further, there may be problems of interaction among different features of the called customer if the call is a forwarded call; for example, the customer's real number, not the pseudo number should be provided to others if the customer makes an outgoing call to someone having incoming call line identification, and the second switch must be adapted to transmit that real number. A third arrangement is to provide routing on the thousands digit as well as the ten thousands group. If the customer who is being moved to the new switch fully occupies one or more thousands groups of public routing numbers, then this solution is possible if the subtending offices are equipped to perform their routing on the thousands digit. This arrangement is very inflexible and especially cannot be used to serve smaller customers who do not occupy a full thousands group.

Accordingly, a problem of the prior art is that there is no satisfactory arrangement for transferring customers being served by a first switch to a second switch for service by that switch without undesirably changing their telephone number.

SOLUTION

In accordance with the principles of this invention, an advance is made over the prior art through the use of a new method and apparatus for establishing calls to a customer having a public routing number, the public routing number having an office code assigned to a first switch, but who is served from a second switch; a centralized database, shared by a plurality of switches, stores information for the public routing numbers served by the first switch and the second switch, and provides routing information, for example, a routing index to switches subtending the first switch. Prior to the completion of a call, a subtending switch which has received the call accesses this database using the called public routing number, and the database returns a routing index. Routing indexes are well known in the prior art and are described, for example, in W. Ulrich et al.: "Translations in the No. 1 Electronic Switching System", *Bell System Technical Journal*, Sep. 1964, pp. 2533–2574. The subtending switch then routes the call to the proper destination office by using this routing index.

In accordance with one aspect of the invention, if any subtending office is not equipped to query the database, the first office comprises translation data for routing the call for completion to the second office. Advantageously, not every subtending office needs to be equipped to query the database.

In accordance with one feature of this invention, customers from a particular first switch may be transferred to one of a plurality of second switches. The identification of that second switch is stored via the routing index in the translation data in the first office.

DETAILED DESCRIPTION

Figure 1:
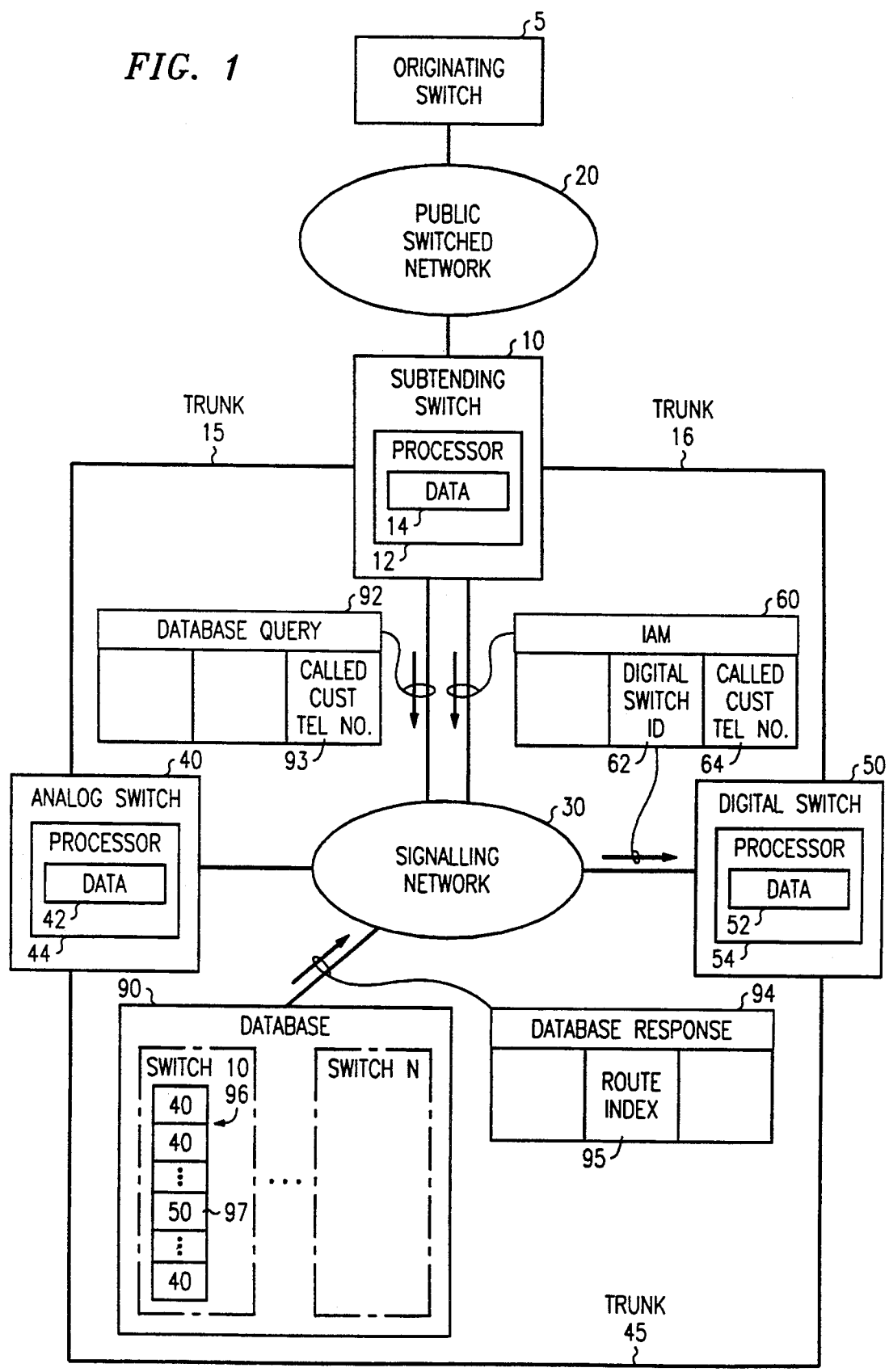
FIG. 1 is a block diagram of a system for practicing the invention.

FIG. 1 is a diagram of an arrangement for implementing applicant's invention. A call from a caller connected to originating switch 5 to a called customer is connected via public switched network 20 to subtending switch 10, comprising processor 12 comprising data 14. The called customer is served by digital switch 50. However, the customer's public routing number is part of a block that is served by analog switch 40.

A database 90 shared by a plurality of switching systems, is provided. This database is accessed over a signaling network 30 by a database query message 92 which includes the called customer telephone (public routing) number 93. The database 90 responds to this query by returning database response message 94 which includes a route index 95. The routing index is found in an entry, 97, of a table 96 for switch 10 stored in database 90. (The route index is shown as being 50, to indicate that it is a route index for routing to digital switch 50.) Subtending switch 10 uses route index 95 to select a trunk group for routing the call to the appropriate one of switches 40 or 50, in this case, to digital switch 50. The call is then established by sending a common channel signaling (CCS) message 60, an Initial Address Message (IAM), or by transmitting the public routing number by multi-frequency (MF) signaling, to request establishment of the call by digital switch 50. The call is routed over a trunk such as trunk 16 connected to digital switch 50. The database query and response messages, and an IAM message, are transmitted over common channel signaling network 30, which comprises a plurality of signal transfer points. Such networks are described, for example, in *The Bell System Technical Journal*, vol. 16, no. 7, part 3, Sep. 1982, pages 1573-1816, especially pages 1579-1654.

While FIG. 1 illustrates two switches one of which is a digital switch and the other an analog switch, any pair or group of switches serving a common office code can be used using the principles of this invention.

Figure 2:
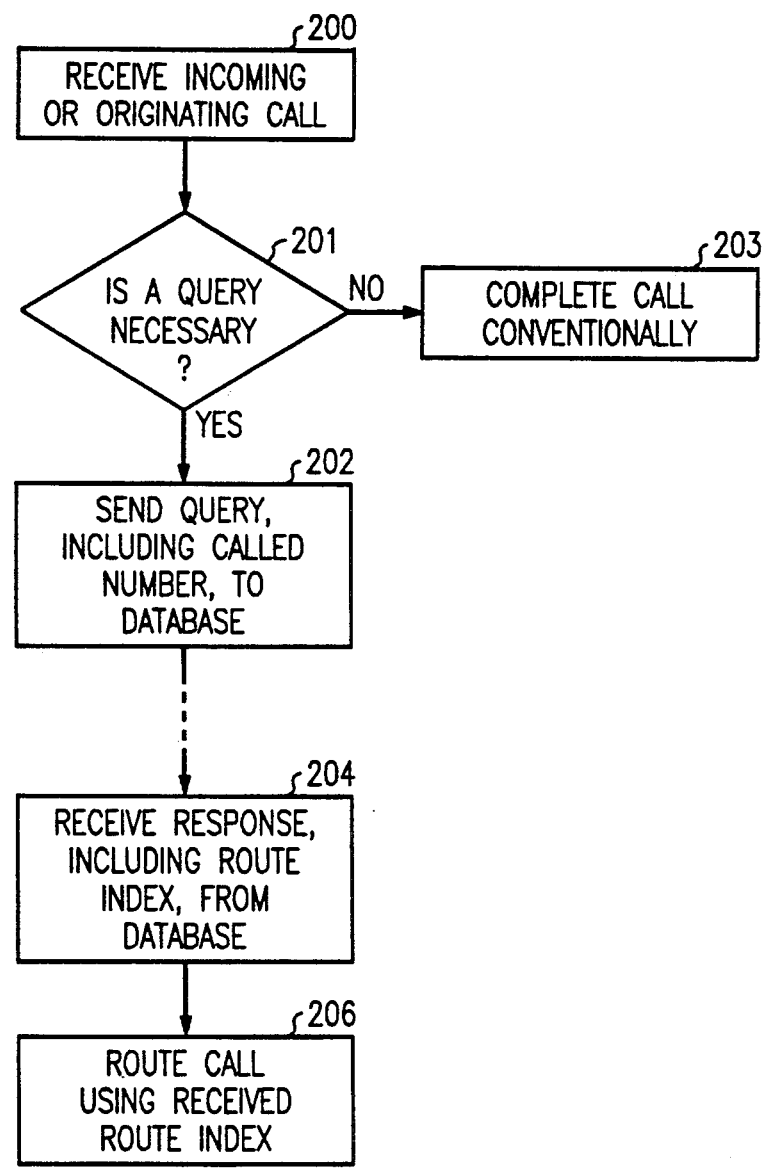
FIGS. 2 and 3 are flow diagrams of steps performed by switching systems and databases for implementing the invention.
Figure 3:
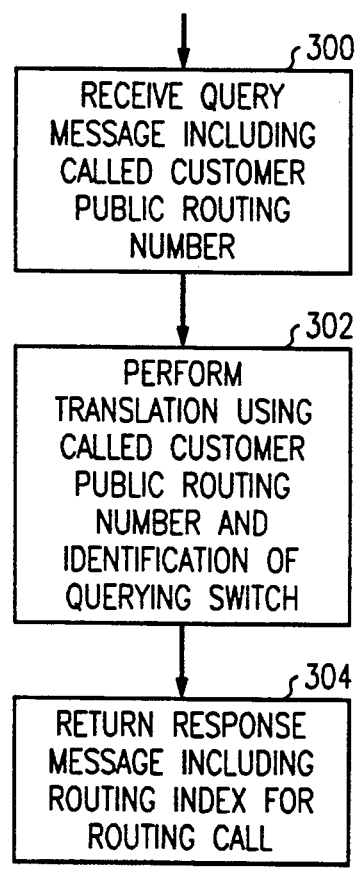

The method is illustrated in FIGS. 2 and 3. FIG. 2 describes the actions performed in the subtending switch. The subtending switch receives an incoming or originating call (action block 204). The subtending switch 10 only performs a database query for certain office codes. The office code translations stored in data 14 of the processor of subtending office 10 are used to identify the office codes requiring the database query. A test 201 determines whether a query is necessary. If not, the call is completed conventionally (block 203). If so, the subtending switch sends a query including the called number to the database (action block 202). In response, the subtending switch receives a response message including a route index from the database (action block 204). The call is then routed by the subtending switch using the received route index (action block 206).

FIG. 3 illustrates the actions performed in the database. The database receives a query message including the called customer telephone number (action block 300) from the subtending switch. The database performs a translation using the called customer public routing number and the identification of the querying switch (action block 302). It then returns a response message including a routing index for routing the call (action block 304) to the subtending switch.

The route index is a particularly desirable quantity to be stored in the database. By supplying the subtending switch with a route index, the database permits that switch to perform normal routing using the dialed public routing number and merely substituting the route index obtained by the database for a route index from the data 14 of switch 10 that could otherwise be used for routing calls for public routing numbers of a given office code to the analog switch 40. Thus, no additional office codes or pseudo directory numbers are required for routing. Since routing indexes are individual to each switch, a separate table, such as table 96, is stored in the database 90 for each subtending switch.

Figure 4:
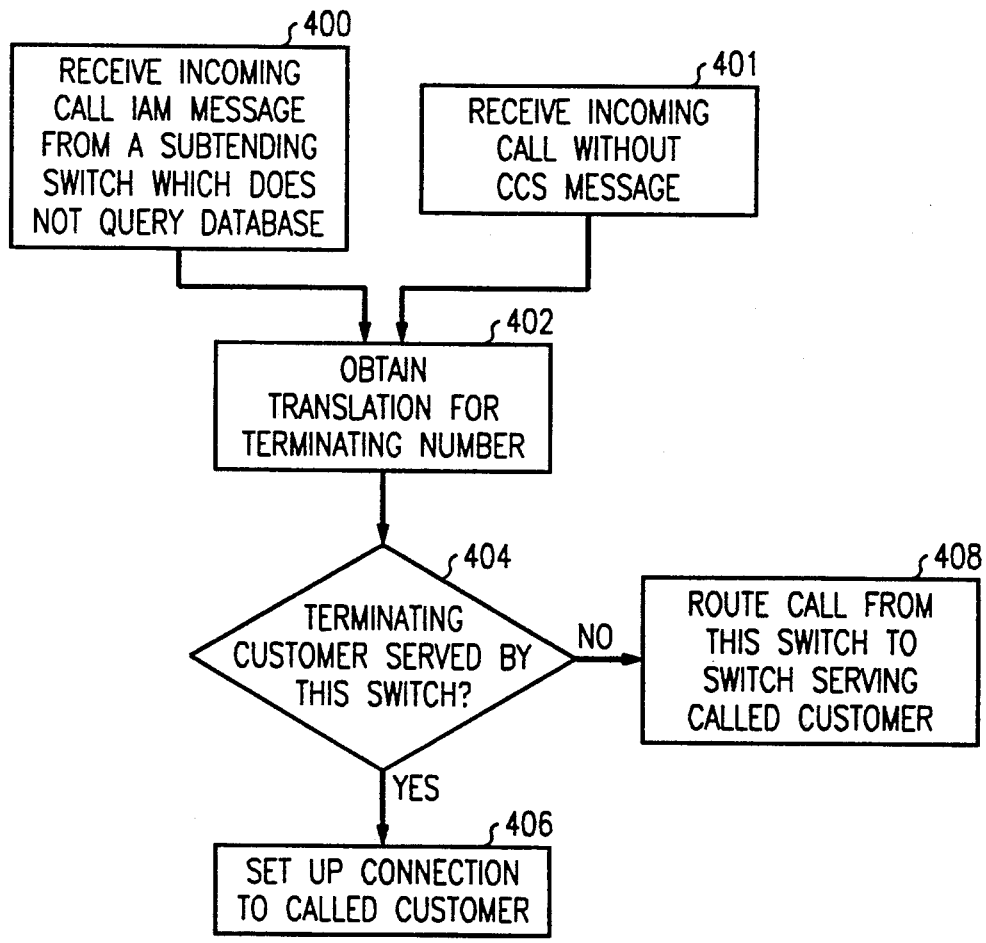
FIG. 4 is a flow diagram of an arrangement for handling a portion of the traffic in a switching network not all of whose switches are equipped to practice the methods shown in FIGS. 2 and 3.

For those cases in which the subtending switches are not equipped to query a database, the call is initially attempted over a trunk such as trunk 15 subtending switch to the analog switch. In the analog switch, a translation is made and if the call is to a customer served by the digital switch 50, the call is extended over a trunk such as trunk 45 interconnecting the analog and digital switch. The call is then completed in the digital switch. This method, as well as the method using a database query, is illustrated in FIG. 4. The end switch either receives an incoming call Initial Address (IAM) message (action block 400) from a switch which does not query the database or, if either the end switch or subtending switch is not equipped to use common channel signaling, then the incoming call is received without a common channel signaling message (action block 401). In either case the translation is obtained in the end switch for the terminating public routing number (action block 402). Test 404 is used to determine whether the terminating customer is served by this switch. If so, then a connection is set up to the called customer (action block 406). If not, the call is routed from this switch to the switch serving the called customer (action block 408). This latter action can be performed, for example, through the use of a translation in data 42 of switch 40 of the received public routing number to a route index for routing the call to switch 50.

The arrangement of FIG. 4 can be used in conjunction with the methods of FIGS. 2 and 3 in networks which are in a transitional phase of modernizing so that some of their switches are equipped with common channel signaling and/or arrangements for accessing databases while others of their switches may not be similarly equipped. Advantageously, the entire network need not be upgraded simultaneously while permitting major economic benefits for traffic from switches that have been upgraded.

The database method is useful for those cases in which the switch from which the customer has been transferred is an especially old switch not equipped for common channel signaling while many or most of the subtending switches are equipped to access a database. The use of a centralized database to store routing information has a major administrative advantage to a Telephone Administration. Once a particular office code is split across two switches, such as an analog switch and a digital switch, the instruction to query the database can be given to all the subtending switches. After that, data concerning individual lines need only be stored in the central database, and the data in the subtending switches need not be changed as lines are moved to the digital switch.

The concept of using a routing index instead of a pseudo directory number has the advantage of conserving directory numbers, which are a valuable commodity to a telephone administration. By using the original called directory number, a public routing number, instead of translating it to a pseudo directory number, correct operation of many switching features is assured. The routing index is a convenient method for a subtending switch to choose the correct route to the destination switch without altering the called partiy's public routing number. A routing index supplies data for selecting a trunk group, and, directly or indirectly, the data to be sent with a CCS message when using that trunk group for a call to a given destination, and also supplies an identification of an alternate route index in case all trunks of the trunk group of the original route index are unavailable. Thus, a route index directly or indirectly supplies full call routing information.

It is to be understood that the above description is only of one preferred embodiment of the invention. Numerous other arrangements may be devised by one skilled in the art without departing from the scope of the invention. The invention is thus limited only as defined in the accompanying claims.

I claim:

1. A method of establishing a telephone call from a caller to a customer, said customer's plain old telephone service (POTS) number comprising an office code assigned to a first switch but served by a second switch, comprising the steps of:

receiving in a third switch of a public switched network, said POTS number assigned to said first switch;

in said third switch, translating the office code of said POTS number to determine whether POTS numbers of said office code are served from two other switches;

if said translating step indicates that said office code is served from two other switches, transmitting a query message, comprising said POTS number, from said third switch of said public switched network to a database shared by a plurality of switches;

responsive to receiving said query, translating in said database to determine information for use in routing said call to said second switch, and transmitting a message comprising said information to said third switch; and responsive to receiving said information, using said information for routing said call from said third switch to said second switch.

2. The method of claim 1 wherein said information comprises a route index for routing said call.

3. The method of claim 1 wherein said transmitting steps comprise the step of transmitting over a data network.

4. The method of claim 3 wherein said data network is a common channel signaling network.

5. The method of claim 4 wherein said common channel signaling network comprises a plurality of signal transfer points.

6. The method of claim 1 wherein said first, second, and third switches are part of a public switched network.

7. A switching system comprising:

means for translating an office code of a plain old telephone service (POTS) number of a received call to determine if POTS numbers of said office code are served from two other switching systems;

means, responsive to an indication from said means for translating that numbers of said office code are served from one other switching system, for extending said call to a destination switch specified in translation information of said switching system;

means, responsive to an indication from said means for translating that numbers of said office code are served from two other switching systems, for transmitting a query message to a database shared by a plurality of switching systems, said query message comprising said POTS number; and means, responsive to receiving a response from said database, for using said POTS number and information of said response message for extending said call toward a particular destination switch for establishing said call.

8. The switching system of claim 7 wherein said query message comprises an identification of said switching system and said information of said response message comprises a route index for use by said switching system.

9. The switching system of claim 7 wherein said received call is to an office code assigned to a first switching system, but is to a customer served by said particular switching system, wherein said information comprises data for use in routing said call to said particular switching system.

10. The switching system of claim 9 wherein said query message comprises an identification of said switching system and said information of said response message comprises a route index for use by said switching system.

* * * * *

UNITED STATES PATENT AND TRADEMARK OFFICE
CERTIFICATE OF CORRECTION

PATENT NO. : 5,237,604

DATED : August 17, 1993

INVENTOR(S) : Deirdre T. H. Ryan

It is certified that error appears in the above-identified patent and that said Letters Patent is hereby corrected as shown below:

Abstract page, left column, line 4;
Inventor "Deirdre T. H. Ryan" should be --Deirdre T. Hoesl--.

Signed and Sealed this

Fifteenth Day of March, 1994

Attest:

BRUCE LEHMAN

Attesting Officer     Commissioner of Patents and Trademarks